United States Patent

[11] 3,628,561

| [72] | Inventor | Herbert O. Corbett<br>Carrollton, Ohio |
|---|---|---|
| [21] | Appl. No. | 885,770 |
| [22] | Filed | Dec. 17, 1969 |
| [45] | Patented | Dec. 21, 1971 |
| [73] | Assignee | National Distillers and Chemical Corporation<br>New York, N.Y.<br>Continuation-in-part of application Ser. No. 396,563, Sept. 15, 1964. This application Dec. 17, 1969, Ser. No. 885,770 |

[54] VALVE STRUCTURE FOR EXTRUDERS
5 Claims, 3 Drawing Figs.

[52] U.S. Cl. .................................................. 137/331,
18/2 HA, 137/489.5, 137/505.13, 264/40
[51] Int. Cl. .................................................. F16k 29/02
[50] Field of Search .......................................... 18/13 C, 14
G, 14 R, 2 HA; 137/488, 98, 99, 331, 489.5, 492,
492.5, 505.13; 264/40, 176, 209

[56] References Cited
UNITED STATES PATENTS

| 1,470,974 | 10/1923 | Hardinge | 137/331 |
| 1,726,721 | 9/1929 | Schullstrom | 137/492.5 |
| 1,769,730 | 7/1930 | Wetmore | 18/14 C |
| 1,845,249 | 2/1932 | Derby | 264/209 |
| 1,987,505 | 1/1935 | Edler | 137/488 X |
| 2,030,771 | 2/1936 | Still | 137/331 X |
| 2,520,430 | 8/1950 | Pearson | 137/331 |

*Primary Examiner*—M. Cary Nelson
*Assistant Examiner*—Richard Gerard
*Attorney*—Allen A. Meyer, Jr.

ABSTRACT: A servosystem for the valve of a plastic extruder wherein the valve is connected to a fluid pressure means operated from a source of constant pressure; the system includes gauge means for ascertaining the pressure of extrudate passing through said valve and flow control valve means associated with said gauge means and said constant pressure means, said flow control valve means being responsive to any variation in extrudate pressure, as indicated by said gauge means, for automatically adjusting the pressure of said constant pressure means to correct any variation from a predetermined pressure.

INVENTOR
HERBERT O. CORBETT

BY Allen A. Meyer, Jr.
ATTORNEY

INVENTOR
HERBERT O. CORBETT
BY *Allen A. Meyer, Jr.*
ATTORNEY

VALVE STRUCTURE FOR EXTRUDERS

The present application is a continuation-in-part of my copending application Ser. No. 396,563, filed Sept. 15, 1964 and titled "Valve Structure for Extruders."

This invention relates to extruder valves and more specifically to valve structure for controlling the flow of plastic extrudate from the extruder to die structure for the extrusion of thin plastic film in tubular form.

Dies for the extrusion of various types of thermoplastic materials, and polyolefins in particular such as polyethylene, polypropylene, and the like, are well known. Normally, the molten resin is forced through an annular orifice to be formed as a tube which is continuously pulled out of orifice which functions as the die. The molten plastic may enter the die in two or more streams which unite prior to passage through the tube-forming orifice and it has been found that a seam or enlarged bead-type section is formed in the extruded tubular film at the point or points where these streams meet thereby materially distracting from the appearance of the finished product. The present invention is intended to obviate this and related problems.

Accordingly, it is a major purpose of the present invention to provide a novel static flow valve for controlling the mass flow of molten resin.

It is a further object of the invention to provide a novel valve of the class with which we here are concerned which will be balanced in operation in order to insure predetermined pressure conditions for the extruder, and absence of variation from such predetermined conditions, by the utilization of a novel measuring control system.

Normal practice in the extrusion of plastic materials contemplates the employment of a control valve between the extruder and the extrusion die and the principal problem in connection with such valves is in the achievement of a truly streamlined flow of molten plastic material through the apparatus. When critical materials such as relatively rigid vinyl and other readily decomposable materials are forced through conventionally designed valves, such materials have a tendency to be trapped in crooks, corners, or the like, creating eddies such as are to be expected when a smooth laminar stream is diverted around a nonstreamlined portion of the passage. This eddying action subjects the trapped materials to heat influences for a greater length of time than the chemical structure thereof is stabilized to withstand. Under these conditions, the plastic material will decompose and contaminate the extrusion process and, when this occurs, the extrusion process cannot be continued since these burned particles will break off and seriously interfere with and deteriorate the extruded product.

The valve design of the present invention provides a novel streamlined flow of the extruded product through the use of an enlarged needle or tuliplike stem for the valve. The flow of plastic is diverted by the round stem with an approach angle on the order of 45°, the round shank reducing the turbulent eddying which otherwise would occur.

Further, in accordance with the invention, a novel automatic extruder pressure control system is provided whereby a servo-type arrangement automatically repositions the valve stem to maintain some predetermined pressure behind the control valve.

Accordingly, a primary object of the invention is to provide a novel valve for controlling the flow of molten resin to an extrusion die.

A further object of the invention is to provide a novel balanced die for the extrusion of polyolefin films having thicknesses on the order of 0.4 to 20 mils.

A still further object of the present invention is to provide a novel valve for extruders which will insure a predetermined back pressure on the extruder at the same time providing a streamlined flow of molten plastic to the extruder orifice.

Further objects of the invention will be readily apparent from the following description taken in conjunction with the accompanying drawings, wherein.

Figure 1:
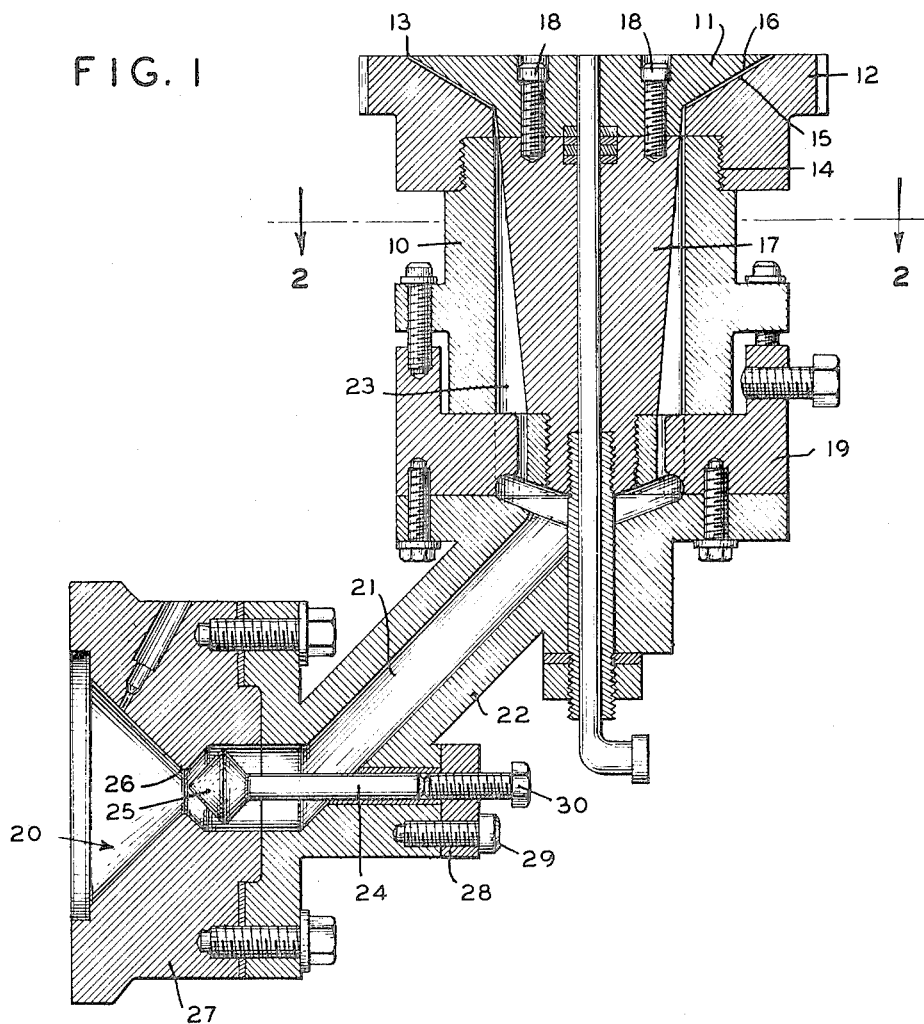
FIG. 1 is a vertical sectional view through a balanced extrusion die wherein the orifice ring is removable and selectively replaceable with rings of different orifice diameter and also illustrating the use of a static valve for controlling introduction of molten resin into the die.
Figure 2:
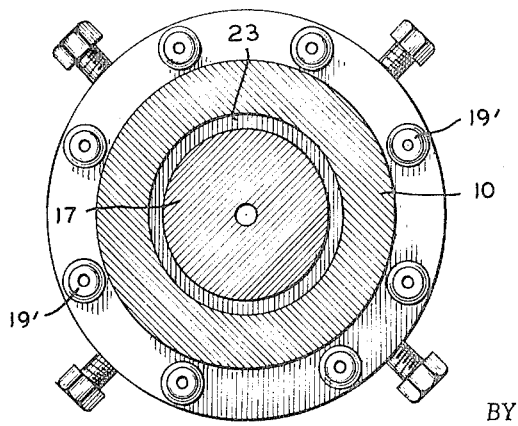
FIG. 2 is a horizontal sectional view taken on the line 2—2 of FIG. 1.

As shown in the drawings, particular reference being had to FIGS. 1 and 2, the extrusion die body 10 includes inner and outer orifice plates 11 and 12 defining an extrusion orifice 13 therebetween. The outer orifice plate 12, which may be threadedly engaged with the die body 10 as indicated at 14 for ready removal therefrom, is provided with an outwardly flared orifice surface 15. The inner orifice plate 11 has a complementarily outwardly flared orifice surface 16 which cooperates with the orifice surface 15 to define the annular output extrusion orifice 13 of some particular diameter.

The inner orifice plate 11 is supported upon the mandrel 17 and is secured thereto by any suitable means as, for example, machine screws or the like 18. The novel orifice plate arrangement as presently described permits the convenient removal of the orifice plates 11 and 12 and the replacement thereof by a similar pair of plates which will provide a different die orifice diameter and/or gauge. Thus, the novel die permits the convenient modification of a particular tube size without requiring replacement of the complete die structure as has been required in connection with prior art devices. It should be understood that the die is capable of any desired orifice diameter within a particularly wide range since the orifice surfaces 15 and 16 may flare inwardly as well as outwardly and a typical range of orifice diameters for the die illustrated could vary from 2 to 10 inches.

A suitable die anchor ring 19 is provided and the die body 10 is secured thereto by any desired means such as the machine screws 19' illustrated. However, the novel removable and selectively replaceable orifice plates may be used with equal facility in dies that do not include this form of anchor ring. Plastic material is supplied to the die 10 from an appropriate source to the chamber 20 in a valve body or housing whereby molten resin such as polyethylene, or the like, will be forced through the connecting passage 21 in the adapter 22 and into the annular channel 23 formed between the interior wall of the die body 10 and the mandrel 17.

Figure 3:
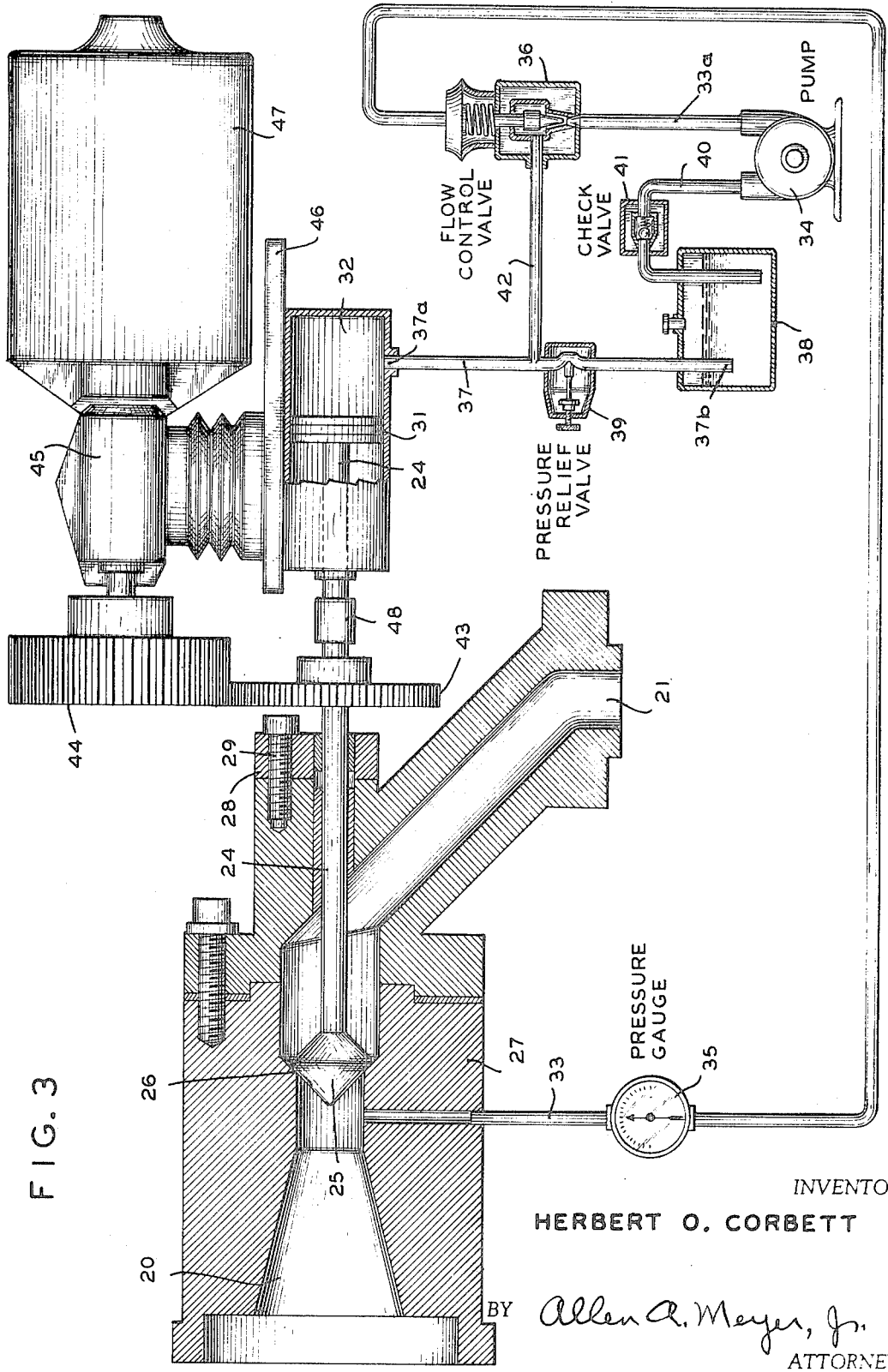
FIG. 3 is a cross-sectional view through the valve per se and illustrating in combination therewith a novel automatically controlled and rotated valve structure and a servosystem for insuring uniformity of pressure as the extrudate moves through the extrusion system.

More specifically, there is illustrated in FIGS. 1 and 3 a valve member 24 having an enlarged head portion 25. The valve member is slidably received within the adapter 22 and cooperates with an annular valve seat 26 provided in the valve body or housing 27 to control the flow of molten resin from the chamber 20 to the adapter connecting passage 21. The valve member 24 may be keyed or otherwise restrained against rotation with respect to the adapter 22, a cap plate 28 being secured to the adapter, as by a machine screw or the like 29, and the threaded adjusting screw 30 extending through the cap plate 28 and having abutting contact with the opposed extremity of the valve 24 permits ready adjustment thereof.

This novel arrangement permits movement of the valve and valve head 25 toward the valve seat 26 by adjustment of the screw 30 without rotation of the valve, the pressure of the exudate insuring that the valve will be urged constantly toward open position against the abutting extremity of the adjusting screws. Thus, an extremely accurate and close control of fluid flow into the die is achieved without unbalance occasioned by nonsymmetry of the valve head 25 and the valve seat 26.

Furthermore, this valve design causes the molten polymer flow to be divided as it surrounds the valve head and stem, thereby overlaying any weld lines between differing polymeric materials. Additionally, the polymeric material seeks an elliptical shape in surrounding the stem which provides a more streamlined path of travel than has been possible under prior art practices. This is particularly important for successful commercial operation and effectively obviates any possibility of "burn-in" of the polymers.

There is illustrated in FIG. 3 of the drawings the novel valve structure described in detail hereabove and modified slightly, together with novel mechanism, or servosystem, shown somewhat diagrammatically, for the control thereof. More specifically, the valve stem 24 projects through the cap plate 28 and is connected directly to a piston 31 which reciprocates within the hydraulic cylinder 32.

A pressure line 33 communicates with the chamber 20 in the valve body 27 and this pressure line leads directly to a remotely located pressure pump 34. A pressure gauge 35 is positioned within the line 33 on the inlet side thereof, adjacent the valve body 27, and a flow control valve 36 is positioned within the pressure line 33 at a point adjacent the pump 34, said valve having a conventional diaphragm structure responsive to the pressure conditions in pressure line 33. It will be understood that extrusion pressure is reflected immediately at the pressure gauge 35 and it is the function of the hydraulic servosystem under discussion to detect under operative conditions any variance from a predetermined pressure as disclosed at the pressure gauge 35 and to make immediate and automatic compensation to correct such variance.

To this end a back pressure line 37 communicates at one extremity 37a with the hydraulic cylinder 32 on the side of the piston 31 which is remote from the valve stem 24, the opposite extremity 37b of this back pressure line communicating with a fluid pressure tank 38 and a pressure relief valve 39 being included in the back pressure line at a point adjacent the fluid pressure tank 38. The low pressure side of the pump 34 has a line 40 communicating with the fluid reservoir tank 38, with a check valve 41 positioned in the line 39. The high pressure side of the pump 34 is connected to the flow control valve 36 by the portion 33a of the pressure line 33 and a line or bypass 42 connects the back pressure line 37 to the flow control valve 36.

To provide for continuous rotation of the valve member 24, during operative conditions, a gear or the like 43 is mounted thereupon and this gear meshes with a second gear 44 which is driven through a gear reduction assembly 45 which is supported in any desired manner upon an appropriate base plate 46 and derives power from a suitable source of power such as a variable speed gearhead drive motor 47.

The motor 47 is energized in any suitable manner whereby the valve member 24 and valve head 25 are rotated continuously at a speed of approximately 1 r.p.m. whereby the valve head and stem are washed continuously and automatically in the extruded stream of molten polymeric material. Since the valve stem is movable axially for control purposes, it is required that the gear 44 be of substantially greater width than the gear 43; thus, the width of the gear 44 will be on the order of the maximum distance of travel permitted for the valve stem 24.

Desirably a suitable coupling 48 is provided in the valve stem 24, between the gear 43 and the adjacent end wall 32a of the hydraulic cylinder 32. This coupling can permit relative rotation between the gear 43 and the piston 31 or, alternatively, the piston 31 can be rotatable within the cylinder 32 to accommodate continuous rotation of the gear 43 and valve member 24.

It will be understood that the valve control system illustrated in FIG. 3 of the drawings, and described hereabove, may be utilized with the valve structure shown in FIGS. 1 and 2, it only being necessary to substitute a stem portion, aligned with the valve shank portion 24 for the adjusting screw 30.

To exemplify the issues with which we here are concerned, the total general range of thermoplastic extrusion pressures is from 0 to 10,000 p.s.i. and 90 percent of the normal operating range is between 3,000 and 4,000 p.s.i.

In accordance with the present invention a predetermined pressure is set by the adjustment of the pressure relief valve 39 when the extrusion is first started and the system is being brought into a state of thermal balance. To start the system, the pressure relief valve 39 is opened to set the hydraulic pressure of the piston at a minimum, for example at 10 p.s.i. The extruder then is brought into operation, the valve 25 will be opened to a degree, the piston 31 will be moved to the right and, when stabilized, the desired (predetermined) pressure of 3,000 p.s.i. (examplary) will be indicated on the pressure gauge 35. The relief valve 39 is then closed until a minimal increase is noted on pressure gauge 35. Both systems (extruder and servo) then will be in a state of hydraulic balance as determined by the relative position of the valve head 25 with respect to its seat 26.

The hydraulic servosystem is constant in its setting. Extrusion pressures, however, vary by reason of such factors as feed rate, temperature, and material viscosity, thermoplastic materials being generally thixotropic and non-Newtonian in nature. The present invention establishes (1) an adjustable opposing force against which the extruder works and (2) automatic valving means to insure the retention of predetermined pressure under operating conditions.

In the system of the present invention, extrusion pressure is indicated by the pressure gauge 35 which is in series with the flow control valve 36 of the servo line 33. Any unbalance as indicated by the gauge 35 will be sensed immediately by the flow control valve 36 which has been calibrated to remain in static balance with the extrusion force created upon the piston 31 as derived from the extruder valve stem 24.

Should the extrusion pressure in the chamber 20 suddenly increase over the predetermined pressure, as indicated on the gauge 35, the flow control valve 36 will respond automatically by instantaneously decreasing the output of pump 34, thereby producing a decrease in pressure in the hydraulic cylinder 32 which will provide corrective action by permitting the extruder valve head 25 to move away from the valve seat 26, thus reducing the excessive pressure in the chamber 20.

The servosystem is maintained in balance by discharging the excess volume of hydraulic fluid back through the pressure relief valve to the reservoir or tank 38. The function of check valve 41 is to prevent the loss of servo pump prime.

It is to be noted particularly that for satisfactory operation of the extrusion system illustrated, extruder pressure variation of as little as 100 p.s.i. affects the process adversely; thus, automatic control to insure uniformity of pressure is essential. The present invention provides a solution to this problem by maintaining a true state of equilibrium between the extrusion pressure on one side of the piston 31 and the pressure of the pump 34, acting through the pressure relief valve 39 and the flow control valve 36, on the other side of the piston 31.

It will be obvious to those skilled in this art that various changes may be made in the invention without departing from the spirit and scope thereof. Therefore, the invention is not considered limited by that which is shown in the drawings and described in the specification and reference therefore is had to the claims for the essentials of the invention and for summaries of the novel features of construction and novel combinations of parts, for all of which protection is desired.

What is claimed is:

1. A static valve for controlling the flow of a fluid material; said static valve including a shank portion terminating at a first end thereof in an enlarged head portion; a valve seat adjacent said enlarged head portion; a shank support means for receiving said shank portion in axially sliding relationship; control means associated with said shank portion for adjustably moving said shank portion in an axial direction to control the spacing between said enlarged head portion and said valve seat; said enlarged head portion defining a conically shaped head having its apex facing away from said valve seat, the sides of said conically shaped head forming an angle on the order of 45 with respect to the longitudinal axis of said valve; said control means including fluid pressure means for axially moving said shank portion in a direction toward said valve seat; pressure sensing means for measuring the pressure of a fluid material upstream of said enlarged head portion; constant pressure means for generating fluid pressure against the extremity of said shank portion which is remote from said enlarged head portion; connecting means connecting said constant pressure means to the interior of said fluid pressure means; flow control valve means for controlling the application of pressure from said constant pressure means to said fluid pressure means; and connecting means from said pressure sensing means to said flow valve means to open and close said flow valve means responsive to variation in pressure between the pressures of said fluid material and said constant pressure means, whereby the enlarged valve head portion will be retained at an axial position so as to maintain the pressure of said fluid material at a predetermined level.

2. The valve assembly as set forth in claim 1 which further includes means for continuously rotating said shank portion and said enlarged head portion about the longitudinal axis thereof.

3. The valve assembly as set forth in claim 2 wherein said fluid pressure means includes a cylinder having a piston therein; one surface of said piston being connected to said shank portion at the extremity thereof remote from said enlarged head portion; and the connecting means between the interior of said fluid pressure means and said constant pressure means is located on the side of said piston remote from said shank portion.

4. A static valve for controlling the flow of a fluid material; said static valve including a shank portion and an enlarged head portion; a valve seat adjacent said enlarged head portion; a shank support means for receiving said shank portion in axially sliding relationship; fluid pressure means for axially moving said shank portion in an axial direction to control the spacing between said enlarged head portion and said valve seat; pressure sensing means for measuring the pressure of a fluid material upstream of said enlarged head portion; constant pressure means for generating pressure in said fluid pressure means whereby said valve is urged toward a closed position; connecting means from said constant pressure means to the interior of said fluid pressure means; flow control valve means for controlling the application of pressure from said constant pressure means to said fluid pressure means; and connecting means from said pressure sensing means to said flow control valve means to indicate variation in pressure between the pressures of said fluid material and said constant pressure means so as to open and close said flow valve means responsive to any such pressure variation and thereby regulate the pressure applied by said constant pressure means whereby the enlarged valve head will be retained at an axial position so as to maintain the pressure of said fluid material at a predetermined level.

5. The valve assembly as set forth in claim 4 which further includes means for continuously rotating said shank portion and said enlarged head portion about the longitudinal axis thereof.

* * * * *